March 11, 1969
C. E. BERRY
3,432,093
NAVIGATION INSTRUMENT
Filed April 19, 1968
Sheet 1 of 2
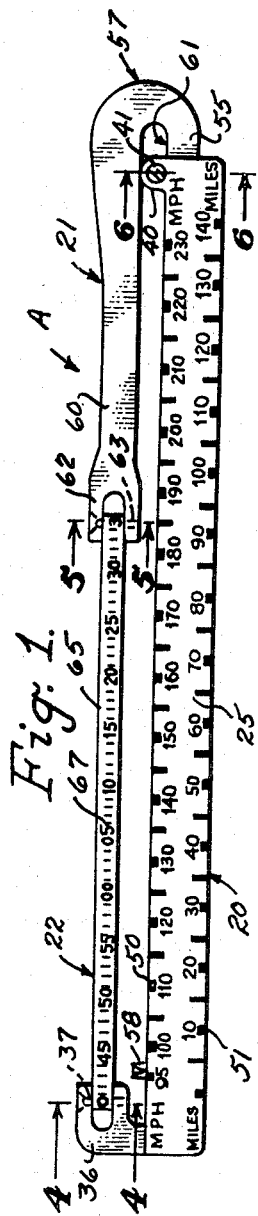
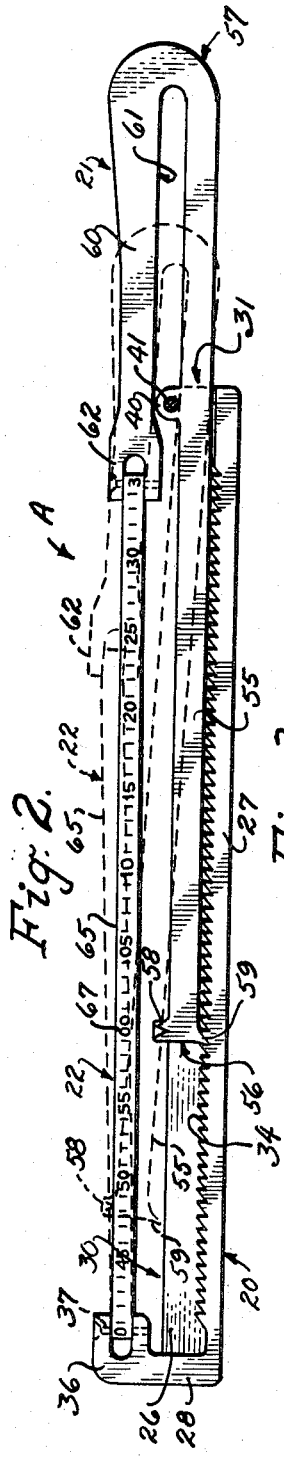
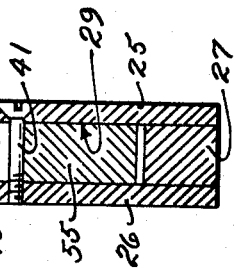
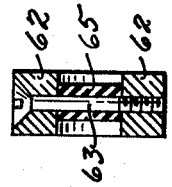
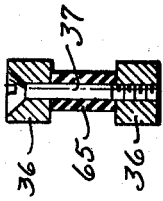
INVENTOR
CHARLES E. BERRY
BY
ATTORNEYS March 11, 1969

C. E. BERRY 3,432,093

NAVIGATION INSTRUMENT

Filed April 19, 1968

INVENTOR
CHARLES E. BERRY

BY

ATTORNEYS

United States Patent Office 3,432,093
Patented Mar. 11, 1969

3,432,093
NAVIGATION INSTRUMENT
Charles E. Berry, Fairmont, W. Va., assignor to Viking Oil Company, Bristol, Tenn., a corporation of Tennessee
Filed Apr. 19, 1968, Ser. No. 722,798
U.S. Cl. 235—61
Int. Cl. G06c 1/00
6 Claims

ABSTRACT OF THE DISCLOSURE

A navigation instrument including cooperatively mounted rate of speed indicia elements and time indicia elements correlated to each other and to a chart having linear distance measurements of a given scale, and wherein the instrument may be referenced to the chart in providing a direct reading of either rate of speed or time when one is a known factor and the other is an unknown factor.

---

This invention relates to improvements in navigation instruments, and more particularly to an improvement in the type of navigation instruments as sown in my Patent No. 3,330,478, dated July 11, 1967.

As more fully set forth in my aforementioned Patent 3,330,478, pilots have heretofore encountered a great deal of difficulty in making navigational computations with rapidity and facility without quite a good deal of in-flight mathematics. The charts used in navigation are fairly well standardized, according to the length of the trip that is to be made and the relative capabilities of the plane which is to be flown. My improved navigation instrument includes rate of speed indicia which is generally within the range of speed at which the particular type of plane will be flown and is correlated to the scale of the chart with which it is to be used, and includes time indicia on a stretchable and contractible band means which is correlated to the scale of the rate of speed indicia and to the scale of the chart. In effect, my improved navigation instrument provides a means for stretching and contracting the time indicia whereby when either speed or time is a known factor and the other is an unknown factor, the instrument may be referenced to the chart in providing a direct reading of the unknown factor.

The primary object of this invention is the provision of a navigation instrument of the type described which may be readily operated by a pilot with very slight distraction from operation of the plane and comprises parts which are not likely to become inoperable when the instrument is needed most.

Other objects and advantages of the invention will be apparent during the course of the following detailed description, taken in connection wtih the accompanying drawings, forming a part of this disclosure, and in which drawings:

FIG. 1 is a side view of my improved navigation instrument.

FIG. 2 is a view similar to FIG. 1, but with one side thereof removed to further disclose the relationship of parts thereof.

FIG. 3 is a top plan view of my improved navigation instrument.

FIG. 4 is an enlarged transverse sectional view taken substantially on the line 4—4 of FIG. 1.

FIG. 5 is an enlarged sectional view taken substantially on the line 5—5 of FIG. 1.

FIG. 6 is an enlarged transverse sectional view taken substantially on the line 6—6 of FIG. 1.

Figure 7:
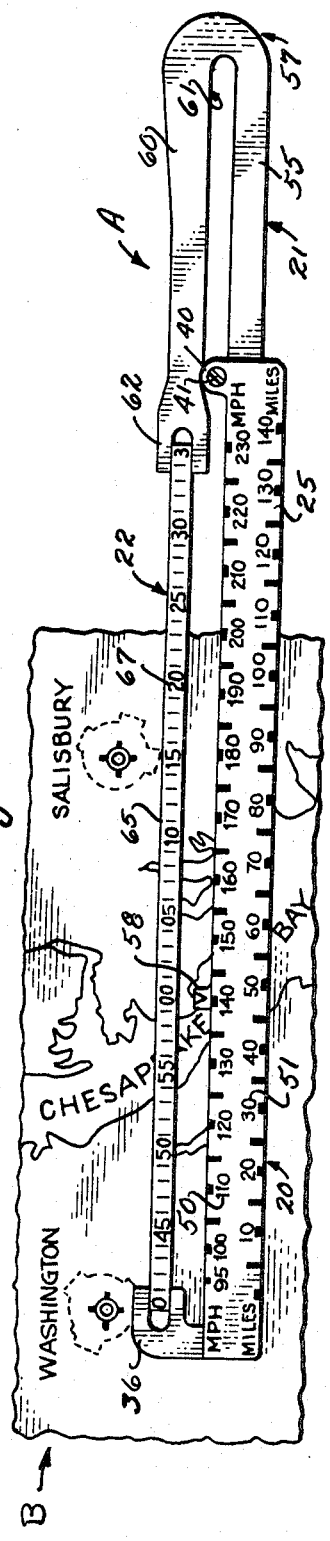
FIGS. 7 and 8 are fragmentary views of a chart such as may be used in association with the instrument, and showing how the navigation instrument is used in connection with such charts.
Figure 8:
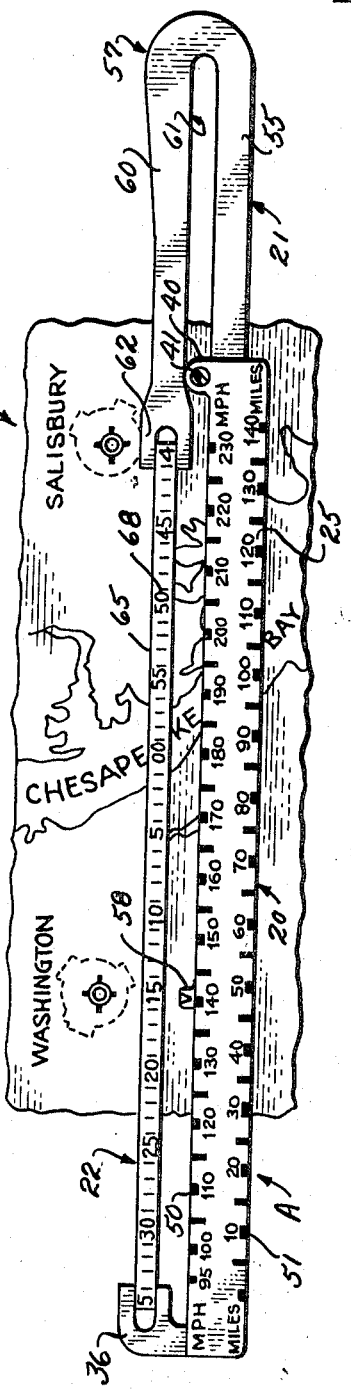

In the drawings, wherein for the purpose of illustration is shown a preferred embodiment of the invention, and wherein similar reference characters designate corresponding parts throughout the several views, the letter A may generally designate my improved navigation instrument and B the portion of a chart as shown in FIGS. 7 and 8.

Navigation instrument A preferably includes a first body portion 20, second body portion 21, and stretchable and contractible band means 22.

First body portion 20 preferably comprises an elongated channel member having substantially parallel spaced-apart side walls 25 and 26, a bottom wall 27 and an end wall 28, defining an elongated channel or slideway 29 which is open at the top 30 thereof and at one end 31 thereof.

Bottom wall 27 is provided with a rack of teeth 34 which extend into channel 29, providing stop means for cooperation with second body portion 21 in comprising releasable clamp means for positioning of second body portion 21 within slideway 29 of first body portion 20, as will be subsequently described.

End wall 28 includes an upstanding bifurcated support portion 36 which receives a vertically extending support pin 37 bridging the space between the bifurcations thereof, the same comprising mounting means for supporting one end of band means 22.

Each side wall 25 and 26, preferably adjacent open end 31 of first body portion 20 is provided with an upstanding ear-like portion 40 which receives therebetween a horizontal pin 41, the same comprising retaining means which cooperates with second body portion 21 in mounting of the same with respect to first body portion 20, as will be subsequently described.

Rate of speed indicia 50 may be provided on the outermost side of either one or both side walls 25 and 26, the same preferably extending to adjacent the open top 30 thereof. Rate of speed indicia 50 will usually comprise speed increments according to the range of speed at which the particular plane with which the device is to be used will be flown. Such rate of speed indicia will also be calibrated to the chart for the particular flight to be made.

For convenience in reading the chart, indicia 51, which is scaled to the statute miles of the chart, may be provided adjacent the lowermost portion of either or both side walls 25 and 26.

Second body portion 21 preferably includes an elongated slide member 55 which is slidably received within channel 29 of first body portion 20, and has inner end portion 56 and an outer end portion 57.

Inner end portion 56 is provided with an upstanding projection 58 which extends above open top 30 of channel 29 and comprises index means for referencing second body portion 21 with respect to rate of speed indicia 50 of first body portion 20. Inner end portion 56 is also provided with a depending projection or detent 59 which comprises a stop means that mates or interfits within the spaces or kerfs between teeth 34 of first body portion 20, providing releasable clamp means for maintaining second body portion 21 at a selected linear position with respect to first body portion 20.

Outer end 57 of second body portion 21 includes a portion of elongated slide member 55 and an upper bight portion 60, comprising a handle of substantially U-shaped configuration which provides a gripping area for linear movement of second body portion 20 with respect to first body portion 20, the space between portions 55 and 60 thereof defining an elongated slot 61 which receives pin 41 of first body portion 20. Upper portion 60 is provided at the outermost end thereof with a bifurcated portion 62 which supports a pin 63 bridging the space between the bifurcations thereof. Pin 63 comprises mounting means for supporting the end of band means 22 opposite the end thereof supported by pin 37 of first body portion 20.

Band means 22 preferably comprises an elongated endless loop member 65 supported at one end thereof by pin 37 of first body portion 20 and at the other end thereof by pin 63 of second body portion 21 in juxtaposition for elongation and contraction in accordance with the movement of second body portion 21 with respect to first body portion 20.

Band means 22 is preferably supported between pins 37 and 63 so that the tension thereof will urge detent 59 of second body portion 21 into contact with the rack of teeth 34 of first body portion 21 and elongated slide member 55 into abutment with pin 41.

Pin 41 thus forms a pivot axis which, in cooperation with band means 22, causes interaction of detent 59 with rack of teeth 34. When it is desired to move second body portion 21 with respect to first body portion 20, particularly in a direction toward end wall 28 thereof, outer end 57 of second body portion 21 is pushed downwardly, causing pivotal movement of second body portion 21 about pin 41 and permitting release of detent 59 from the rack of teeth 34, for slidable movement of second body portion 21 with respect to first body portion 20, as shown in dotted lines in FIG. 2.

Time indicia is preferably provided on both sides of band means 22, time indicia 67 on one side thereof being provided to read from left to right when the left-hand end of the instrument is used as the primary index point, as shown in FIG. 7, and time indicia 68 on the other side thereof being provided to read from right to left when the right-hand end of the instrument is used as the primary index point, as shown in FIG. 8.

As will be seen by a comparison between FIGS. 1 and 2, referring to time indicia 67 of band means 22, linear movement of second body portion 21 with respect to first body portion 20 will cause an effective stretching or contraction of time indicia 67 thereof.

Chart B, as shown in FIGS. 7 and 8 for illustrative purposes, is a fragment of a world aeronautical chart for the Chesapeake Bay region, having a scale of 1:1,000,000. Rate of speed indicia 50 will be calibrated within the general range of flight speed of the plane to be flown and to such chart, and time indicia 67 and 68 will also be calibrated to the scale of such chart.

Referring to FIG. 7, and assuming that the take-off from washington Airport is at 1:40, it is planned to fly at a ground speed of 140 miles an hour and it is desired to know when Salisbury will be reached, band means 22 is moved until the numeral 40 of time indicia 67 is at pin 37, second body portion 21 is linearly moved with respect to first body portion 20 so that indicator means 58 is aligned with rate of speed indicia 140, the left-hand end of the instrument, adjacent pin 37, is indexed on Washington and the instrument laid down on chart B, extending between Washington and Salisbury. You may then read directly from the time indicia that the time of arrival in Salisbury will be 2:15, flying at this speed. Also, if you desire to arrive at Salisbury at 2:15, leaving Washington at 1:40, for instance, band means 22 is rotated to the numeral 40, second body portion 21 linearly moved with respect to first body portion 20, the index point being on Washington, until the time indicia is stretched to that numeral 15 thereof is adjacent Salisbury, and you can then read directly from the rate of speed indicia which is indexed by indicator means 58 that you must fly at 140 miles per hour in order to reach Salisbury at this time.

FIG. 8 illustrates the case in which it is desired to read from right to left on the navigation instrument and band means 22 has been turned over so that time indicia 68 thereof is positioned for facile reading, and, as above described, by indexing the navigation instrument with pin 63 adjacent Salisbury, you can directly read from the instrument that, for instance, flight time from Salisbury to Washington at 140 miles an hour will be from say 1:40 to 2:15, or, conversely, knowing the length of time which you wish to allot in flight, for instance from 1:40 to 2:15, that you must fly at 140 miles per hour in order to reach Washington at the designated time.

Various changes in the size and arrangement of parts may be made to the form of the invention herein shown and described without departing from the spirit of the invention.

I claim:

1. For use in association with a chart, a navigation instrument having a frame including a first body portion and a second body portion, at least one exterior side of said first body portion having increments of rate of speed indicia thereon, said first body portion including an elongated channel member defining a slideway for slidably receiving said second body portion, said second body portion including an elongated slide member slidably mounted within said slideway of said first body portion for linear movement with respect thereto; stop means on each said first and second body portion; stretchable and contractible band means, having increments of time indicia thereon, both said increments of rate of speed indicia and said time indicia being correlated with each other and correlated to a scale on said chart; mounting means adjacent one end of said first body portion; and mounting means on said second body portion, said mounting means of said first and second body portions being juxtaposed with respect to each other in supporting said band means therebetween under tension and permitting stretching of said band means upon linear movement in one direction of said second body portion with respect to said first body portion and contraction of said band means upon linear movement in the opposite direction of said second body portion with respect to said first body portion, said stop means of said first body portion and said stop means of said second body portion comprising releasable clamp means cooperatively operable by the tension of said band means for clamping one of said stop means with respect to the other and maintaining said second body portion at a selected linear position with respect to said first body portion, said second body portion including index means for indexing the same with respect to the rate of speed indicia of said first body portion whereby upon linear movement of one of said body portion with respect to the other to index a known rate of speed, the instrument referenced with said chart provides a direct reading of time for traversing a given linear distance measurement of said chart at the known rate of speed, and whereby upon linear movement of one of said body portions with respect to the other to index a known time reference with said chart, a direct reading is provided at the rate of speed in traversing a linear distance measurement of said chart in the known time.

2. An instrument as specified in claim 1 wherein the time indicia is provided on both sides of said band means, one such time indicia reading from left to right in time intervals and the other time indicia reading from right to left in time intervals, and said mounting means provides for reversal of said band means to permit facile reading of the time indicia desired, whereby the desired time indicia may be directly read in selected instances of both a left to right and right to left reading thereof.

3. An instrument as specified in claim 1 wherein said stop means of said first body portion comprises a rack of teeth disposed along the lowermost portion of the channel thereof, said stop means of said second body portion comprises a detent provided adjacent one end of said second body portion for mating with said teeth of said first body portion, and said second body portion includes handle means for linear movement of said second body portion with respect to said first body portion.

4. An instrument as specified in claim 3 wherein the end of said first body portion adjacent said handle means includes retaining means, said retaining means being in abutment with said second body portion, said band means being mounted above said retaining means in juxtaposition whereby the tension of said band means causes said second body portion to abut against said retaining means as a pivot axis and causes pivotal movement of said second body portion for engagement of said detent of said second body portion with said rack of teeth of said first body portion.

5. An instrument as specified in claim 4 wherein said second body portion is pivotally movable about said retaining means for disengagement of said detent means with said rack of teeth of said first body portion to permit relative linear movement of said second body portion with respect to said first body portion.

6. In a navigation instrument for use in association with a navigation chart having linear distance measurements of a given scale, the combination of a frame including a first body portion and a second body portion, said first body portion comprising an elongated member having spaced apart side walls and a bottom wall which define an elongated channel open at the top and at least one end thereof and extendant substantially the length of said elongated member, said bottom wall having a plurality of teeth extending into said channel, one of said side walls having rate of speed indicia calibrated along the exterior surface thereof in proximity to the open top of said elongated channel, said second body portion including an elongated slide member slidably mounted within said channel of said first body portion, index means on said second body portion for indexing the same with respect to the rate of speed indicia of said first body portion, said slide member portion having a detent adjacent one end thereof for cooperation with said teeth of said first body portion, and having a handle at the opposite end thereof, retainer means provided adjacent the open end of said first body portion, stretchable and contractible band means having increments of time indicia thereon correlated to the scale of said chart and to the indicia of first body portion, mounting means for said band means on each said first and second body portions, said mounting means of each said first and second body portion being positioned for supporting said band means in a spaced apart position above the open top of said first body portion in juxtaposition whereby tension of said band means causes said second body portion to abut against said retaining means and to pivot thereabout in bringing said detent of said second body portion into locking engagement with said teeth of said first body portion, said second body portion being pivotally movable about said retaining means for release of said detent from said teeth of said first body portion, whereby upon linear movement of one of said body portions with respect to the other to index a known rate of speed, the instrument referenced with the chart provides a direct reading of time for traversing a given linear distance measurement of the chart at the known rate of speed, and whereby upon linear movement of one of said body portions with respect to the other to index a known time reference with the chart, a direct reading is provided of the rate of speed in traversing a given linear distance measurement of the chart in a known time.

References Cited

UNITED STATES PATENTS

| 2,190,472 | 2/1940 | Ferrughelli | 235—70 |
| 2,256,116 | 9/1941 | Hughes | 235—69 |
| 2,508,898 | 5/1950 | Stronstorff | 235—61 |
| 2,512,184 | 6/1950 | Suydam | 235—61 |
| 3,193,195 | 7/1965 | Jeffries | 235—61 |
| 3,213,544 | 10/1965 | Adler | 33—158 |
| 3,229,905 | 1/1966 | Holmes | 235—70 |
| 3,330,478 | 7/1967 | Berry | 235—61 |

FOREIGN PATENTS

| 859,647 | 6/1940 | France. |
| 996,308 | 8/1951 | France. |

RICHARD B. WILLIAMS, *Primary Examiner.*

S. A. WAL, *Assistant Examiner.*

U.S. Cl. X.R.

235—71, 86